United States Patent [19]

Corse

[11] 4,119,003

[45] Oct. 10, 1978

[54] APPARATUS FOR TRANSVERSELY CUTTING A WEB OF MATERIAL

[75] Inventor: Louis Gaston Corse, Chaumont-sur-Tharonne, France

[73] Assignee: Machines Chambon, Orleans, France

[21] Appl. No.: 786,982

[22] Filed: Apr. 13, 1977

[30] Foreign Application Priority Data

Apr. 13, 1976 [FR] France ................................ 76 10765

[51] Int. Cl.[2] .......................... B26D 1/56; B23D 25/02

[52] U.S. Cl. .......................................... 83/341; 83/349

[58] Field of Search .......................... 83/341, 349, 343

[56] References Cited

U.S. PATENT DOCUMENTS

| | | | |
|---|---|---|---|
| 1,006,783 | 10/1911 | Paquin | 83/341 |
| 2,149,822 | 3/1939 | Ungar | 83/341 X |
| 2,805,715 | 9/1957 | Novick | 83/341 |
| 3,380,328 | 4/1968 | Martin | 83/341 X |
| 3,401,585 | 9/1968 | Schmermund | 83/341 |

*Primary Examiner*—Willie G. Abercrombie
*Attorney, Agent, or Firm*—J. Harold Nissen

[57] ABSTRACT

Apparatus is provided for transversely cutting up a web of material to form blanks of equal length, particularly tickets. The apparatus comprises a cutting head and infeed means for feeding the web to the cutting head. The cutting head has a frame supporting a cutting cylinder and a counter-blade. The cutting cylinder is provided with at least one blade on its periphery. The frame is arranged to pivot about a vertical axis that is disposed laterally of the web. This enables the angle of the cutting head relative to the web to be adjusted in dependence upon the rate of feed of the web. Means are provided for driving the cutting cylinder and the infeed means in such a manner that their speeds are in a fixed ratio.

8 Claims, 3 Drawing Figures

APPARATUS FOR TRANSVERSELY CUTTING A WEB OF MATERIAL

BACKGROUND TO THE INVENTION

This invention relates to apparatus for transversely cutting a web of material to form short lengths thereof, and in particular for cutting up a web to form tickets.

Ticket-cutting machines are known which make use of a rotatable cutting apparatus for forming individual tickets from a web of material carrying repeated printed matter, by transversely cutting the web at intervals corresponding to a dimension of the tickets. Such a cutting apparatus which is arranged at the outlet side of a rotary printer, comprises a pair of infeed elements formed by cylinders or shafts carrying rollers; a rotating cutting device which comprises an upper rotatable cutting cylinder which carries one or more blades, and a lower counter-blade; and means for discharging the cut tickets. All the rotating elements are driven by the main shaft of the machine through transmission means having suitable transmission ratios dependent upon the diameters of the rotary elements, so that the peripheral speeds of all of these elements are the same.

A known cutting apparatus that is used in such a machine comprises an angularly adjustable cutting head which includes an upper frame carrying the rotatable cutting cylinder and the counter-blade, the frame itself being mounted to pivot about a vertical axis which is disposed laterally in relation to the web so as to enable the shaft of the cutting cylinder and the axis of the counter-blade to be disposed at an angle to the web, this angle being variable in dependence upon the rate of feed, that is to say upon the speed at which the web moves. With such a cutting device, this is necessary, since the cutting operation is not carried out along a continuous transverse line in one stroke. Instead, the cut occurs as a series of perforations, these perforations being made one after another by the blades of the cutting cylinder as the cutting cylinder rotates. Thus, the point at which cutting occurs continuously moves along the edge of the counter-blade during rotation of the cutting cylinder. It is, therefore, necessary for the angle of the unit formed by the cutting cylinder and the counter-blade to be adjusted in dependence upon the rate of feed of the web, so as to obtain a straight cut extending at right-angles to the edge of the web.

Hitherto, in such an apparatus having an angularly adjustable cutting head, the driven infeed cylinder has been driven directly from the main shaft of the machine, whereas the cutting cylinder has been driven from the main shaft via a vertical shaft and a pair of bevel pinions which enable the cutting head to pivot about the axis of this vertical shaft.

Although, theoretically, the speeds of rotation of the cutting cylinder and the infeed cylinder of such a cutting apparatus should be matched to produce tickets of constant length, practice has shown that this is not so. In fact, if the ends and edges of stacked tickets, cut up in this manner, are aligned and the tickets are measured, it will be found that the cutting up operation has not been carried out with sufficient precision to enable the tickets to be used in a ticket-issueing machine.

The aim of the invention is to eliminate this disadvantage by particularly simple means which enable tickets to be cut off in an extremely precise manner.

SUMMARY OF THE INVENTION

The present invention provides apparatus for transversely cutting up a web of material, the apparatus comprising a cutting head constituted by a cutting cylinder, which is rotatable about its axis and which carries at least one blade on its peripheral surface, a counter-blade extending below the cylinder, and a frame which carries the cutting cylinder and the counter-blade and which is mounted to pivot about a vertical and lateral axis so as to adjust the angle of the cutting head in relation to the web in dependence upon the speed or rate of feed of the web, and a pair of infeed elements which are arranged one above and the other below the web, upstream of the cutting head, and are urged towards each other, wherein the shaft of the cutting cylinder and the shaft of the infeed element that is disposed below the web are each associated with a pinion, the pinions having helical teeth, which are in direct engagement with each other.

Thus, the drive to the shaft of the cutting cylinder carrying the cutting blades is precisely matched to the drive to the infeed elements which drive the web, so that for each angular displacement of the cutting cylinder there corresponds a strictly proportional angular displacement of the infeed elements which drive the web. The lengths of web fed in by the infeed elements are thus precisely identical for each two consecutive cuts, and consequently the lengths of the tickets are all exactly the same. In this way, it is possible to eliminate the errors which arise from the lack of precision in transmitting actuating force to the cutting cylinder.

BRIEF DESCRIPTION OF THE DRAWINGS

Apparatus for cutting up a web of material to form tickets and constructed in accordance with the invention will now be described, by way of example, which reference to the accompanying drawings, in which.

DESCRIPTION OF PREFERRED EMBODIMENT

Figure 1:
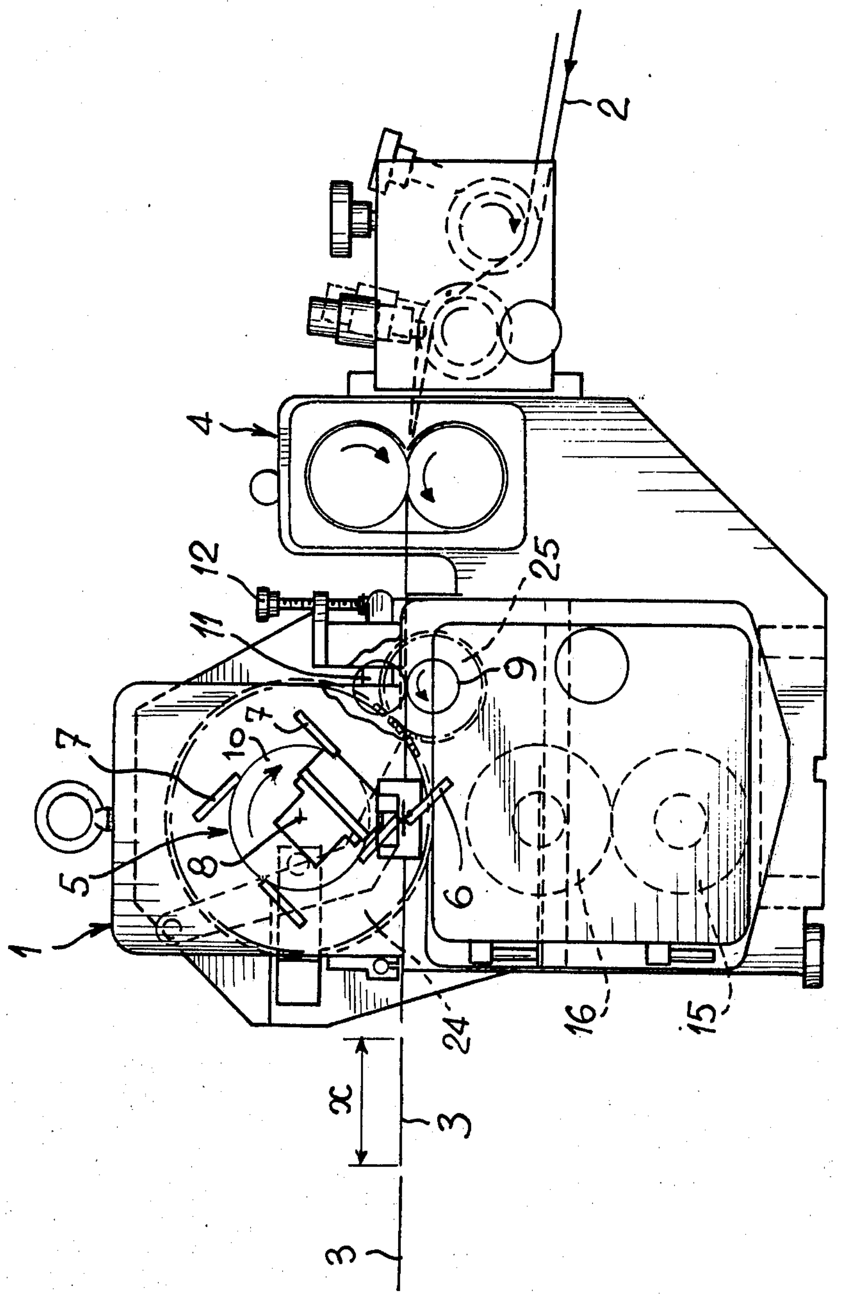
FIG. 1 is a diagrammatic elevational view of the apparatus.

Referring to the drawings, the transverse cutting apparatus, indicated generally by the reference numeral 1, is designed to form blanks 3 of predetermined format from a continuous web 2 of paper, cardboard or like material. In other words, these blanks 3 are required to have a strictly uniform longitudinal dimension $x$ corresponding to the desired format. These blanks 3 may in particular form tickets, in which case, the transverse cutting apparatus 1 is preceded by a longitudinal cutting apparatus 4 which cuts up the web 2 into a plurality of parallel tapes which are introduced into the transverse cutting apparatus 1.

The cutting apparatus 1 consists of a rotatable cutting cylinder 5, arranged above the web 2 and substantially transverse thereto, and of a fixed counterblade 6 arranged below the web. The cutting cylinder 5 comprises a cylindrical body 10 on which are mounted a number of blades 7, equidistantly spaced around the axis 8 of the cutting cylinder (in the example illustrated in FIG. 1, there are four of these blades, whereas in the arrangement shown in FIG. 2 there are two).

As can be seen from the drawings, the axis 8 of the cutting cylinder 5 is inclined in relation to the transverse plane at an angle *a* which depends upon the cut format *x*, as will be seen later.

The counter-blade 6, which is positioned below the web 2, is formed by a fixed horizontal element. During rotation of the cutting cylinder 5, the cutting edge of each of the blades 7 crosses the edge of the counter-blade 6 to form an individual perforation, these perforations being made one after another. Thus, the point at which cutting occurs continuously moves along the edge of the counter-blade 6 during rotation of the cutting cylinder 5. Since the cutting head is inclined at an angle selected in accordance with the rate of feed of the web 2, the cutting line is transverse, clean and continuous.

The transverse cutting apparatus 1 also includes, upstream of the cutting cylinder 5 and of the counter-blade 6, a transverse infeed cylinder 9, positioned below the web 2, and above this cylinder 9, a backing cylinder 11 which is pressed against the infeed cylinder 9, a device 12 being provided for adjusting this pressure.

Figure 2:
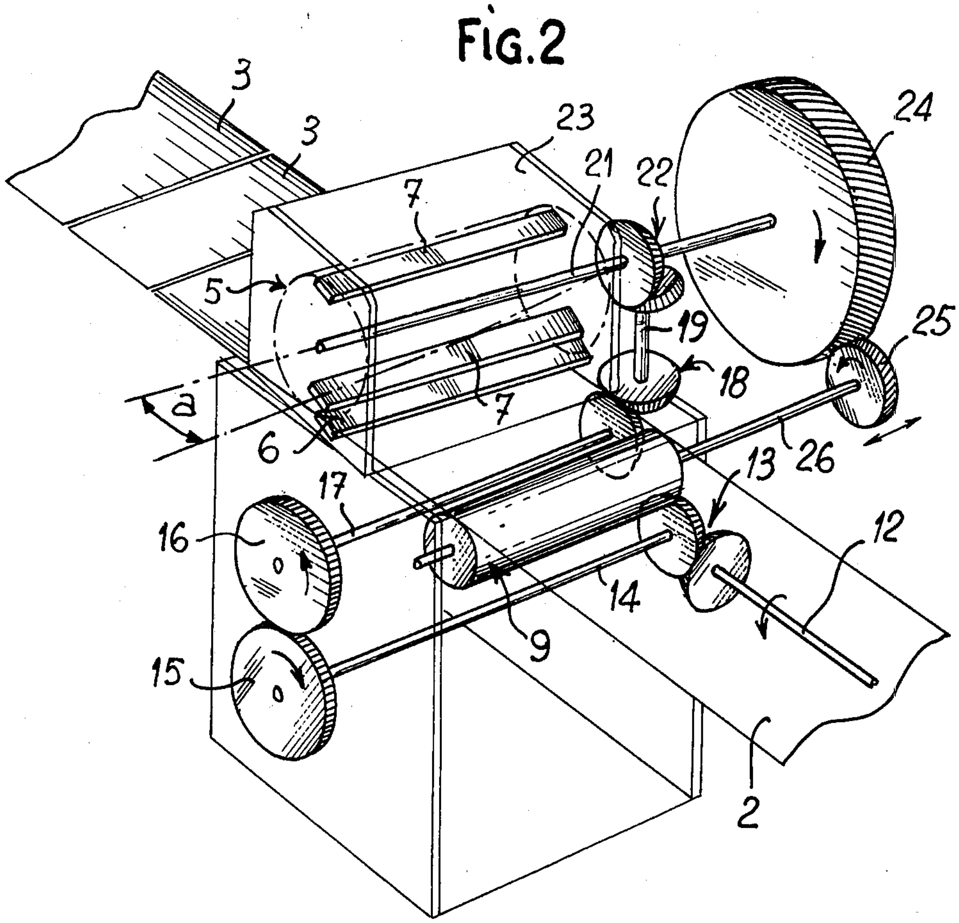
FIG. 2 is a diagrammatic perspective view of the apparatus of FIG. 1.
Figure 3:
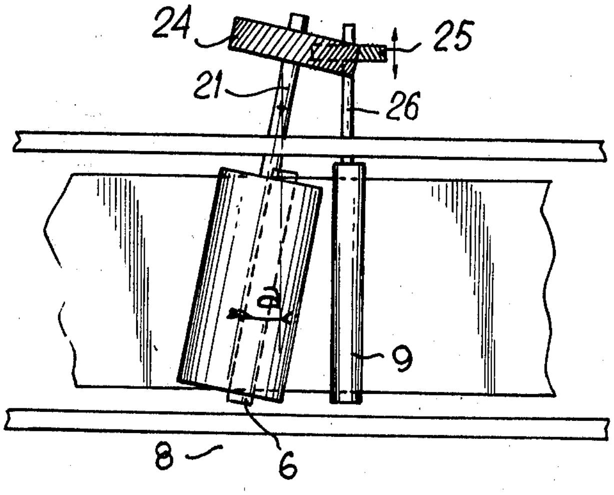
FIG. 3 is a diagrammatic plan view showing the angle between the cutting cylinder and the infeed cylinder of the apparatus.

With particular reference to FIG. 2, the method whereby the cutting cylinder 5 and the infeed cylinder 9 are rotated will now be described. The cutting apparatus is provided with a longitudinal main drive shaft 12 which, via a pair of bevel pinions 13, drives a transverse shaft 14, at one end of which is mounted a numbering pinion 15. This numbering pinion 15 meshes with another, upper, numbering pinion 16 rigidly mounted on a transverse shaft 17. On the other side of the apparatus, this shaft 17 is connected to a vertical shaft 19 by way of a pair of bevel pinions 18. This vertical shaft 19 is connected to the shaft 21 of the cutting cylinder 5 by way of a further pair of bevel pinions 22. Thus, rotation of the main shaft 12 is transmitted to the shaft 21 of the cutting cylinder 5.

For varying the angle *a* of the axis 8 of the cutting cylinder 5 in relation to the transverse plane in dependence upon the format, this cylinder is mounted on a frame 23 which is able to pivot as a whole about the axis of the vertical shaft 19. The frame 23 also carries the counter-blade 6 and thus forms an angularly adjustable cutting head.

To achieve a very high degree of precision in cutting off the blanks (tickets) 3, the cutting cylinder 5 and the infeed cylinder 9 are directly connected by way of pinions 24 and 25 having helical teeth. The pinion 24 is rigidly mounted on the shaft 21 of the cutting cylinder 5, and the pinion 25, which is of smaller diameter, is rigidly mounted on the shaft 26 of the infeed cylinder 9.

The lengths of cut, that is to say the distance *x* in the longitudinal direction of the cut blanks 3, will depend upon the number of blades 7 on the cutting cylinder 5, upon the relationship of the torque of the numbering pinions 15 and 16, upon the circumference of the infeed cylinder 9 and upon the torque of the helical pinions 24 and 25. The pinion 25 may, instead of being rigidly connected to the shaft 26 of the infeed cylinder 9, be axially displacable along this shaft. This slight adjustment enables it to be brought into the optimum position in dependence upon the angle of inclination of the cutting head, which angle is determined beforehand by calculation.

As the transmission ratio between the two pinions 24 and 25 having helical teeth is best defined at approximately one tooth, a blank of extremely precise dimensions is obtained by adjusting the diameter of the infeed cylinder 9 so that the tangential speed of the latter corresponds exactly to the speed at which the web 2 passes it.

I claim:

1. Apparatus for transversely cutting up a web, the apparatus comprising a cutting head having a transverse shaft, a cutting cylinder firmly mounted on said transverse shaft, at least one blade being provided on the periphery of the cutting cylinder, means for causing said transverse shaft and the cutting cylinder to rotate about the axis of said transverse shaft, a counter-blade extending below the cutting cylinder, a frame carrying the cutting cylinder and the counter-blade and mounted to pivot about a vertical and lateral axis so as to adjust the angle of the cutting head in relation to the web in dependence upon the rate of feed of the web, a first infeed element disposed below the web upstream of the cutting head, a second infeed element disposed above the web upstream of the cutting head, the first and the second infeed elements being pressed against each other, a first pinion having helical teeth and firmly mounted on the shaft of the cutting cylinder, and a second pinion having helical teeth and associated with the first infeed element, the helical teeth of the first and second pinions directly engaging each other.

2. Apparatus according to claim 1, wherein the second pinion associated with the first infeed element, is coaxially displaceable.

3. In apparatus for transversely cutting up a web of material to form blanks of equal length, the apparatus comprising a cutting head and infeed means for feeding the web to the cutting head, the cutting head comprising a cutting cylinder having at least one blade on its periphery, a counter-blade extending below the cutting cylinder, and a frame carrying the cutting cylinder and the counter-blade, the frame being mounted to pivot about a vertical axis that is disposed laterally of the web whereby the angle of the cutting head is adjustable in dependence upon the rate of feed of the web, the improvement comprising providing means for driving the cutting cylinder and the infeed means in such a manner that their speeds are maintain in a fixed ratio.

4. In the apparatus as claimed in claim 3, wherein said driving means comprises a first pinion having helical teeth and associated with said cutting cylinder and a second pinion having helical teeth and associated with said infeed means, and the helical teeth of said first and second pinions directly engage each other.

5. In the apparatus as claimed in claim 4, wherein the helical teeth of said first and said second pinions are precisely matched with each other so that for each angular displacement of said cutting cylinder a strictly proportional corresponding angular displacement is imparted by said helical teeth of said first and second pinions to said infeed means.

6. In the apparatus as claimed in claim 5, wherein said first pinion and said cutting cylinder are rigidly mounted together, and said second pinion and said infeed means are rigidly mounted together, said first pinion being of a smaller diameter than said second pinion.

7. In the apparatus as claimed in claim 5, wherein said first pinion and said cutting cylinder are rigidly mounted together, and said second pinion is axially displaceable relative to said infeed means to permit said second pinion to be brought into an optimum position in dependence upon the angle of said cutting head.

8. Apparatus as set forth in claim 1, wherein said first pinion is directly connected with said cutting cyliner, and said second pinion is directly connected with said first infeed element.

* * * * *